US009454451B2

(12) United States Patent
Campbell

(10) Patent No.: US 9,454,451 B2
(45) Date of Patent: Sep. 27, 2016

(54) APPARATUS AND METHOD FOR PERFORMING DATA SCRUBBING ON A MEMORY DEVICE

(71) Applicant: ARM LIMITED, Cambridge (GB)

(72) Inventor: Michael Andrew Campbell, Cambridge (GB)

(73) Assignee: ARM Limited, Cambridge (GB)

( * ) Notice: Subject to any disclaimer, the term of this patent is extended or adjusted under 35 U.S.C. 154(b) by 357 days.

(21) Appl. No.: 13/764,050

(22) Filed: Feb. 11, 2013

(65) Prior Publication Data

US 2014/0229766 A1 Aug. 14, 2014

(51) Int. Cl.
*G06F 11/00* (2006.01)
*G06F 11/30* (2006.01)
*G06F 11/10* (2006.01)

(52) U.S. Cl.
CPC ......... *G06F 11/3037* (2013.01); *G06F 11/106* (2013.01)

(58) Field of Classification Search
CPC ... G06F 11/10; G06F 11/106; G06F 11/3037
See application file for complete search history.

(56) References Cited

U.S. PATENT DOCUMENTS

| | | | |
|---|---|---|---|
| 5,428,761 A | 6/1995 | Herlihy et al. | |
| 6,292,869 B1 | 9/2001 | Gerchman et al. | |
| 6,349,390 B1 * | 2/2002 | Dell et al. | 714/6.24 |
| 6,965,537 B1 | 11/2005 | Klein et al. | |
| 7,100,004 B2 * | 8/2006 | Johnson et al. | 711/159 |
| 7,882,323 B2 * | 2/2011 | Allison | G06F 11/106 711/167 |
| 2001/0029592 A1 | 10/2001 | Walker et al. | |
| 2001/0047497 A1 | 11/2001 | Larson et al. | |
| 2009/0177932 A1 | 7/2009 | Abts et al. | |
| 2010/0332900 A1 * | 12/2010 | Yang | 714/16 |
| 2011/0305067 A1 * | 12/2011 | Ueda | 365/148 |
| 2012/0317352 A1 | 12/2012 | Kang et al. | |
| 2014/0281810 A1 * | 9/2014 | Gifford | G06F 11/106 714/764 |

FOREIGN PATENT DOCUMENTS

GB  2 289 779  11/1995

OTHER PUBLICATIONS

Microsoft Computer Dictionary, Fifth Edition, 2002, p. 445.*

(Continued)

*Primary Examiner* — Michael Maskulinski

(74) *Attorney, Agent, or Firm* — Nixon & Vanderhye P.C.

(57) ABSTRACT

An apparatus and method are provided for opportunistically performing scrubbing operations on a memory device. The apparatus is used for accessing the memory device in response to access requests issued by at least one requesting device and comprises interface circuitry that is configured to access the memory device in response to the access requests. The apparatus also comprises activity monitoring circuitry which generates memory access activity data that results from memory access activity between the interface circuitry and the memory device. Scrubbing circuitry is also included and is configured to issue scrubbing access requests to perform the scrubbing operations, the scrubbing access requests being issued in response to the memory access activity data indicating a trigger condition. The above apparatus allows scrubbing access requests to be issued taking into account actual memory access activity between the interface circuitry and the memory device, thereby allowing the access requests to be issued opportunistically in such a way that the performance cost/system power consumption necessary to achieve a particular reliability can be reduced compared to known techniques.

22 Claims, 5 Drawing Sheets

(56) References Cited

OTHER PUBLICATIONS

GB Search Report dated Jul. 15, 2014 in GB Application No. 1400372.7, 4 pages.
GB Examination Report issued Oct. 16, 2015 in GB 1400372.7, 3 pages.
UK Examination Report dated Feb. 9, 2016 issued in GB 1400372.7, 3 pages.

* cited by examiner

APPARATUS AND METHOD FOR PERFORMING DATA SCRUBBING ON A MEMORY DEVICE

BACKGROUND OF THE INVENTION

1. Field of the Invention

The present invention relates to an apparatus and method for performing data scrubbing on a memory device.

2. Description of the Prior Art

It is known in memory devices for errors to accumulate over time. For example, bits of data in the memory device may be flipped as a result of environmental effects such as: background radiation, cosmic rays, neutron strikes, and/or alpha particle emissions. That is, if a bit stores the logical value '1', this could be flipped to the logical value '0', and vice versa.

A known way of responding to such errors is to use error correction techniques. For example, the inclusion of error correction codes (ECCs) can be used to add redundant information that can be used to detect and correct an error in the memory. Such a technique may be used in, for example, DRAM memory.

However, error correction techniques are limited in their ability to detect or correct errors in data stored in memory. In particular, the number of errors that can be detected or corrected is dependent on the amount of redundant data (for example the number of ECC codes) stored in addition to the data. Consequently, it is necessary to increase the amount of redundant data stored if it is desired to increase the number of errors that can be corrected in the data stored in memory. Storing this additional redundant data requires additional storage space, which in turn leads to an increased physical size and power consumption of the memory device. If the number of errors in the data of the memory device is too large, i.e. if the error correction technique does not have sufficient redundant data in order to be able to recover the stored data, then that portion of data in the memory device is corrupt and cannot be recovered, i.e. the data is lost.

A known technique for alleviating this problem is to use what is known as scrubbing to seek to avoid too many errors accumulating. Scrubbing involves the process of sending a read request to an area of memory to read the data stored in that area, checking that data to determine if there are any errors, correcting any errors in the data using any error correcting techniques that are available, and writing back the corrected data to that area of memory. If scrubbing is performed frequently enough, this can avoid the problem of accumulating errors beyond the point at which error correction techniques can be used to recover the data.

However, scrubbing has an impact on performance. In particular, since scrubbing involves making repeated requests for data in the memory device purely to perform scrubbing of that data, scrubbing uses both bandwidth of the memory device and increases power consumption, and therefore has an impact on the performance of the system as well as its power consumption.

In RAID memory devices, it is known to use a controller to perform scrubbing by periodically reading all the disks in an array, and checking for errors.

It would be desirable to provide a technique which performs scrubbing in such a way that the performance cost and/or the power consumption necessary to achieve a particular level of data reliability by performing the scrubbing is reduced.

SUMMARY OF THE INVENTION

Viewed from a first aspect, the present invention provides an apparatus for accessing a memory device in response to access requests issued by at least one requesting device, said apparatus comprising: interface circuitry configured to access said memory device in response to said access requests; activity monitoring circuitry configured to generate memory access activity data resulting from memory access activity between said interface circuitry and said memory device; and scrubbing circuitry configured to issue scrubbing access requests for processing by the interface circuitry, wherein said scrubbing circuitry is configured to issue said scrubbing access requests in response to said memory access activity data indicating a trigger condition.

According to the present invention, activity monitoring circuitry is provided, which is able to generate memory access activity data that results from memory access activity between the interface circuitry and the memory device. In other words, the interface circuitry sends access requests to the memory device, which may include both those solicited by the at least one requesting device (also referred to herein as "solicited" access requests) and access requests not solicited by the at least one requesting device, such as the scrubbing access requests issued by the scrubbing circuitry (also referred to herein as unsolicited access requests). The access requests cause memory access activity to take place. The activity monitoring circuitry is thereby able to generate memory access activity data in response to the memory access activity. The scrubbing circuitry is configured to issue scrubbing access requests (for subsequent processing by the interface circuitry) when the memory access activity data indicates that a trigger condition has occurred, i.e. when the memory access activity data indicates the presence of a particular event. Scrubbing access requests closely resemble the solicited access requests sent by the at least one requesting device, a difference between the two types of request being that the scrubbing access requests request data from the memory device in an unsolicited manner. That is, the scrubbing access requests are directed towards data in the memory device that has not been explicitly requested by the at least one requesting device. Consequently, after the data has been retrieved from the memory device, it is only processed by the scrubbing circuitry and is not sent to a requesting device.

By generating the scrubbing access requests as a result of memory access activity between the interface circuitry and the memory device, it is possible to generate scrubbing access requests in such a manner that they do not significantly impact the bandwidth, performance, or power consumption. In particular, the scrubbing access requests can be generated based on actual memory access activity. This activity could be generated from any one of a number of requesting devices. Accordingly, the memory access activity data may indicate that an opportunity exists to perform scrubbing with lower performance cost/power consumption as a result of memory access activity that has occurred.

Consequently, scrubbing is performed in an intelligent manner, e.g. by taking advantage of a known condition or state of the memory device as a consequence of processes going on in and around the memory device. The scrubbing access requests can be issued in such a way that the requests will not significantly impact on bandwidth, power, and performance of the system, and hence for example the performance cost/power consumption of performing scrubbing may be at least partially hidden or encompassed by other operations performed by the memory device.

This represents a large improvement over typical prior art scrubbing techniques that are carried out in an unintelligent manner. That is, in such prior art scrubbing occurs regardless of memory access activity and without regard to what the memory device is actually doing. Consequently, each scrubbing access request requires substantially the same performance cost/system power consumption of a solicited access request.

The apparatus can be constructed in a variety of ways. However, in one embodiment, the scrubbing circuitry is configured to perform at least one scrubbing operation, each scrubbing operation being defined by configuration data. Each scrubbing operation may issue at least one of the scrubbing access requests having regard to the configuration data that defines the scrubbing operation. In this embodiment, the user is able to specify the way or ways in which scrubbing occurs. This embodiment hence provides one or more scrubbing operations with configuration data for each scrubbing operation, the configuration data dictating when and how scrubbing is to occur. By performing each scrubbing operation having regard to the configuration data, it is possible to control how opportunistic versus proactive a particular scrubbing operation is. This can be used by a user to control the trade-off between reliability, in which scrubbing is performed extensively in order to best reduce the probability of data loss, and performance cost/system power consumption, in which scrubbing is performed less extensively in order to reduce power consumption or improve system performance.

Where the user wishes to improve reliability, the configuration data for a scrubbing operation will lead to scrubbing access requests being issued more readily. However, this will lead to a decrease in available memory bandwidth and will increase power consumption of the device. Alternatively, if the user wishes to obtain a lower performance cost/system power consumption, then the configuration data may direct the scrubbing operation to issue scrubbing access requests more conservatively. However, this may lead to particular areas of memory not being scrubbed regularly enough, and there is a higher probability that the number of errors in a given piece of data will increase beyond the point at which the data can be recovered.

In one embodiment, said scrubbing circuitry comprises a plurality of scrubbing handlers, each scrubbing handler being configured to perform an associated scrubbing operation, and the configuration data comprising configuration data that is associated with each scrubbing handler and that defines the associated scrubbing operation. In such an embodiment, the user is able to specify a number of scrubbing operations, each scrubbing operation executing on a scrubbing handler and each scrubbing operation being defined by its own configuration data. That is, a plurality of scrubbing handlers could be configured to execute a number of identical scrubbing operations, or a plurality of scrubbing handlers could be configured to perform completely different scrubbing operations from each other. Of course, the skilled person will realise that any point between these two extremes is also possible. For example the scrubbing handlers may be configured so that half of the scrubbing handlers perform a single identical scrubbing operation, and the remaining scrubbing handlers each perform a different scrubbing operation. In this way, the user is able to specify a different trade-off between reliability and performance cost/system power consumption for different scenarios.

In one embodiment, the scrubbing circuitry comprises analysis circuitry configured to analyse said memory access activity data and to determine from said memory access activity data whether said trigger condition is met.

When operating in accordance with the embodiment described earlier, in which the scrubbing circuitry comprises a plurality of scrubbing handlers, with each scrubbing handler being configured to perform a scrubbing operation, the configuration data associated with each scrubbing operation may take a variety of forms. In particular, the configuration data may include any number of the following parameters: a trigger condition, an address region, an application region, a priority level, and/or a power-up flag.

The trigger condition can be used to indicate the particular circumstances under which the associated scrubbing operation starts, i.e. begins to issue the access requests required to perform that scrubbing operation.

The address region indicates a particular section of the memory device to which the associated scrubbing operation applies. In this way, a particular scrubbing operation can be configured to start only when memory access activity data relating to one or more addresses of the memory device within the address region is issued. Memory access activity data relating to other regions of the memory device may be disregarded by this scrubbing operation, and may either be handled by a different scrubbing operation, or may be disregarded entirely.

The application region indicates a region of the memory device to which the scrubbing access requests are targeted when the trigger condition is met. That is, when a "hit" occurs on the trigger condition, the scrubbing operation may issue at least one scrubbing access request to each address of said memory device within the application region. In other words, the application region is a region of the memory device to which the scrubbing operation is applied.

The priority level represents the relative importance of each scrubbing access request issued as a result of the scrubbing operation taking place. In some embodiments, the apparatus may be configured to respond more quickly to access requests with higher priority levels than those of lower levels.

A power-up flag can be used to indicate that a portion of the memory device is to be powered up if that portion of the memory device is in a low power mode, in order to allow the scrubbing operation to take place. While in a low power mode of operation, access requests to memory addresses in portions of the memory device that are in low power mode may be issued by the at least one requesting device, but remain as pending access requests until the relevant portion of the memory device is powered up. This power-up flag configuration option can be used to indicate that scrubbing access requests can also be generated by the scrubbing circuitry whilst the relevant portion of memory is in the low power mode, so that that portion of the memory device that is in a low power mode will be powered up specifically in order to respond to those scrubbing access requests that have been issued.

In some embodiments, the configuration data further comprises a second trigger condition. The second trigger condition may act as a stop trigger condition such that when this second trigger condition is detected, the scrubbing operation is interrupted or temporarily stopped. For example, if it is determined that a change in state of the memory device has occurred which will increase the performance cost/system power consumption of any further scrubbing access requests issued for a particular scrubbing operation, then that scrubbing operation may be paused or stopped.

In some embodiments, the configuration data further comprises a reset address flag. The reset address flag determines the behaviour of the scrubbing handler when the scrubbing operation is resumed after having been interrupted, in particular whether, when the scrubbing operation starts again, it issues scrubbing access requests to the next memory address after the point at which it was interrupted, or whether it must begin again from the first memory address within the application region. In some embodiments, if the reset address flag is not set then the scrubbing handler is configured to store a memory address of a last scrubbing access request issued by the scrubbing operation when the scrubbing operation is interrupted. When the scrubbing operation starts again, i.e. when the trigger condition is next detected, the scrubbing operation is configured to begin from the stored memory address. An advantage of not resetting a scrubbing operation, i.e. of storing the memory address of a last scrubbing access request issued by the scrubbing operation, is that all memory addresses scrubbed by the scrubbing operation are treated as having equal importance. This avoids the situation in which a scrubbing operation is repeatedly started and stopped, and the same portion of first memory addresses are repeatedly scrubbed by the scrubbing operation, but later memory addresses are scrubbed with lower frequency.

In the description of above embodiments the term "set" has been used. It will be clear to a person of ordinary skill in the art that such a term may either refer to the storing of a logical value '1' or the storing of a logical value '0'. Similarly, the terms "not set", "clear", and "unset" may be used interchangeably to refer to an inverse of the aforementioned storing process, and accordingly may either refer to the setting of a logical value '0' or a logical value '1', respectively.

Embodiments of the present invention may comprise at least one external input scrubbing handler which is configured to receive scrubbing instructions received by the apparatus. The external input scrubbing handler may receive scrubbing instructions originating from outside the apparatus, for example from one of the at least one requesting devices, and in dependence on those scrubbing instructions, or as a consequence of those received scrubbing instructions, may issue a plurality of scrubbing access requests. In this way, a process or circuit outside the scrubbing circuitry may cause a particular scrubbing operation to take place. Such a scrubbing operation may occur using a predefined configuration, or may be dynamically configured by the external source, with that configuration being identified by the received scrubbing instructions. The external source may include, but is not limited to, another circuit, the processor, or a user of the apparatus. Accordingly, scrubbing operations can be dynamically programmed and configured in order to meet a variety of situations that were not originally envisioned, or in response to a particular detected event from something external to the scrubbing circuitry.

In some embodiments, the apparatus comprises a configuration register for storing the aforementioned configuration data. The register may be a dedicated register specifically for storing configuration data, or alternatively the configuration register may be a general purpose register used for storing data.

The activity monitoring circuitry can take a variety of forms. In one embodiment said activity monitoring circuitry may comprise error detection circuitry for detecting errors in data returned from the memory device as a result of said access requests. Such error detection circuitry may detect errors by the use of for example, ECC codes or checksums. In some embodiments, the scrubbing circuitry may be configured to detect the trigger condition if the memory access activity data detects a predetermined number of errors in data within a page of memory returned from the memory device as a result of said access requests. Accordingly, such a trigger is "hit" as a result of a number of errors being detected within a particular region (e.g. a page) of memory. This may be indicative of the fact that that region of memory has not been scrubbed with sufficient regularity in order to adequately prevent errors from accumulating. An advantage of using such a trigger is that the presence of one or more errors within a region of memory is a good indicator of errors in the same region of memory. Consequently, in order to prevent these errors accumulating to such a degree that the data cannot be recovered, a scrubbing operation can be carried out on that region of the memory. By basing the trigger on a predetermined number of errors in data within a region of memory, it is possible to delay the scrubbing process until necessary, having regard to the error recovery capabilities and the criticality of the data. In some embodiments, the predetermined number of errors is one. That is, on the detection of any error within a page of memory, a scrubbing operation will be initiated to issue scrubbing access requests to all memory addresses within the same page of memory.

According to some embodiments, the activity monitoring circuitry comprises a state machine for maintaining information concerning an operating state of said memory device. In some embodiments, the state machine is able to maintain information relating to a power state of each portion of the memory device. For example, the information maintained by a state machine may be used to determine whether a particular portion of the memory device is in a low power state, about to enter a low power state, or is powered up (or any other granularities of allowed power state). In one embodiment, the state machine may comprise information on a power state of the entire memory device, or may maintain power state information on each of a plurality of memory address regions of the memory device. In one embodiment, the scrubbing circuitry is configured to detect said trigger condition if said memory access activity data generated by the state machine indicates that at least a portion of the memory device is to enter a low power state.

The information maintained by the state machine may also indicate an access state of particular portions of memory within the memory device. For example, the state machine may be able to indicate whether a page of memory within the memory device has been activated, i.e. opened. Whilst open, addresses within a particular page of memory can often be accessed without significant additional energy expenditure. In accordance with this embodiment, a scrubbing operation can be carried out on a page of memory when that page of memory has already been activated. Consequently, scrubbing can be performed on that page of memory without incurring the power consumption associated with activating that page of memory, thereby improving reliability while not significantly affecting system power consumption.

In accordance with an embodiment of the present invention, said activity monitoring circuitry comprises capacity monitoring circuitry for monitoring available capacity between said interface circuitry and said memory device taking into account said memory access activity between said interface circuitry and said memory device. The activity monitoring circuitry may take a variety of forms, and may measure various network characteristics such as: latency, bandwidth, throughput, or a number of access requests, for example. The available capacity determined by the activity monitoring circuitry may result directly from the memory access activity between the interface circuitry and said memory device. Alternatively, the available capacity determined by the activity monitoring circuitry may indirectly result from said memory access activity between said interface circuitry and said memory device. For example, said activity monitoring circuitry may take account of said memory access activity and perform additional calculations in order to arrive at an estimate of future memory access activity.

In one embodiment the scrubbing circuitry may be configured to detect said trigger condition if said memory access activity data indicates that said available capacity is at least a predetermined value. In this way, the trigger condition is indicative of the fact that there are resources available for scrubbing access requests to be issued. The trigger condition may either indicate that the available capacity is at least a predetermined value, or may indicate that the available capacity has become at least a predetermined value. In this way, the trigger condition could be configured to be a repetitive reminder that the available capacity is at least a predetermined value. Such a configuration is advantageous in signalling that the available capacity is still available and that scrubbing access requests can continue to be sent. The predetermined value may be selected in order that scrubbing access requests are only sent in this particular way if the available capacity is high enough. For example, in one embodiment the predetermined value may be equal to the capacity of the link between the interface circuitry and the memory device, thereby ensuring that scrubbing access requests are only sent in this manner when no other access requests are being processed.

In some embodiments, all or a subset of the above examples of activity monitoring circuitry may be included within the apparatus.

In embodiments of the present invention, said apparatus comprises a queue for storing a plurality of pending access requests. The apparatus is configured to issue said at least one scrubbing access request to said queue and said interface circuitry is configured to select at least one of said pending access requests for processing from said queue. In this way, a number of access requests can be buffered or stored, before being processed. Access requests can be kept in the queue until processed. In one particular embodiment, the interface circuitry is configured to examine a priority field of said at least one pending access requests in order to determine which of said pending access requests in the queue should be processed first.

According to a second aspect of the invention, there is provided a method for accessing a memory device in response to access requests issued by at least one requesting device, said apparatus comprising: employing interface circuitry to access said memory device in response to said access requests; generating memory access activity data resulting from memory access activity between said interface circuitry and said memory device; and issuing scrubbing access requests for processing by the interface circuitry in response to said memory access activity data indicating a trigger condition.

According to a third aspect of the invention there is provided an apparatus for accessing a memory device in response to access requests issued by at least one requesting device, said apparatus comprising: interface means for accessing said memory device in response to said access requests; activity monitoring means for generating memory access activity data resulting from memory access activity between said interface circuitry and said memory device; and scrubbing means for issuing scrubbing access requests for processing by the interface means, wherein said scrubbing means issues said scrubbing access requests in response to said memory access activity data indicating a trigger condition.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
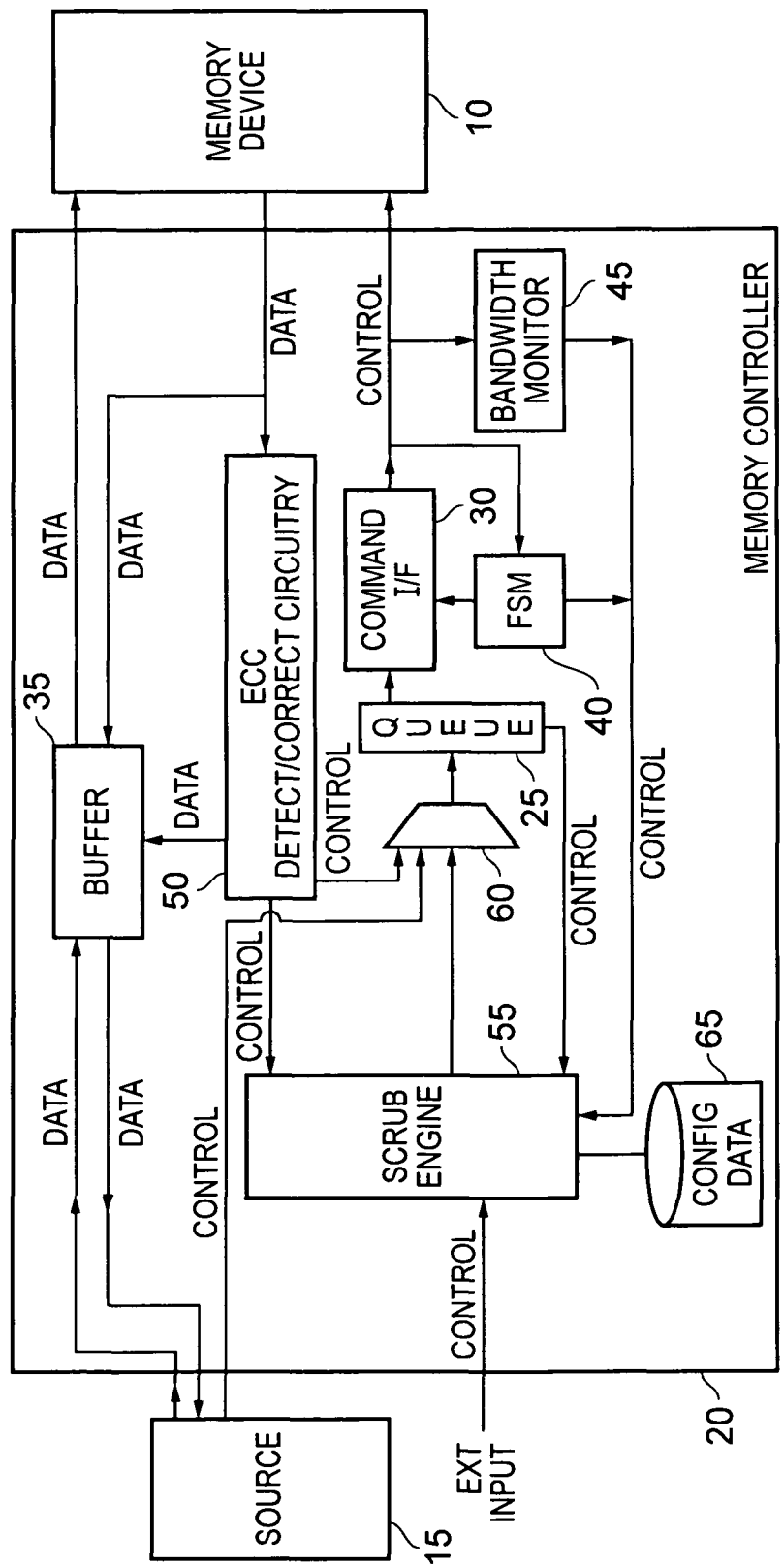
FIG. 1 is a block diagram illustrating an apparatus in accordance with one embodiment.

FIG. 1 is a block diagram of an apparatus 20 in accordance with one embodiment, in this embodiment the apparatus taking the form of a memory controller. A source of access requests 15 is arranged to issue write transactions and read transactions to the memory controller 20 in order to write data into the memory device 10 and read data from the memory device 10. The source of access requests 15 can take a variety of forms, but in one embodiment an interconnect structure with a System-on-Chip (SoC) will have a variety of devices coupled thereto, for example a central processing unit, a graphics processing unit, etc, and any one of these devices may issue write or read transactions via the interconnect structure, the interconnect structure then forwarding those transactions to the memory controller 20.

Both control paths and data paths are provided for write and read transactions, with the control paths being used to identify the relevant control information for the transactions, such as the address to be accessed, the size of the address, etc, and the data paths being used to route the associated write data and read data. In the embodiment shown in FIG. 1, the data paths are shown schematically to identify data being sent between the memory device 10 and source 15 via buffer 35. It will be appreciated by those skilled in the art that the buffer circuitry 35 can take a variety of forms, and indeed may involve separate components for the write and read data paths.

In the embodiment shown in FIG. 1, the memory device 10 consists of a plurality of DRAM chips, and both write and read accesses to the memory device 10 are performed as burst accesses comprising multiple beats. The memory device may be formed of one or more replaceable DIMMs, or alternatively the chips may be soldered-down, non-replaceable, components. The memory device 10 is accessed during each beat of a burst access, and typically, for a burst write operation, data will be written into each of the chips during each beat, and similarly during the burst read operation, data will be read from each of the chips during each beat.

Each write or read transaction will involve the issuance of one or more access requests to the memory controller, and in this embodiment memory controller 20 manages the access requests via a queue 25. Examples of suitable queues may include, for example, a first-in-first-out (FIFO) queue or a priority based queue. It will be appreciated that although the term "queue" has been used here, there is no requirement for the elements of the queue to be ordered. Similarly, the term "queue" is not intended to discount the use of other abstract data structures such as, for example, stacks. Access requests that are pending are held by the queue 25 and command interface 30 is configured to determine which of the pending access requests is next to be processed. The command interface 30 may make this decision based on, for example, a priority of the access requests in the queue 25, or an order in which the access requests were added to the queue 25. Once a pending access request has been selected by the command interface 30, the access request is forwarded to memory device 10.

Memory access activity data is generated by activity monitoring circuitry. In this embodiment, the activity monitoring circuitry comprises Finite State Machine (FSM) 40, bandwidth monitor 45, and ECC detect/correct circuitry 50. Although the activity monitoring circuitry of the present embodiment utilises these three circuits, other embodiments may use a different combination of circuits, one of these circuits in isolation, or other activity monitoring circuits to generate memory access activity data resulting from memory access activity between the command interface 30 and the memory device 10.

FSM 40 is configured to snoop, i.e. receive copies of, access requests sent by command interface 30 to memory device 10. By snooping the access requests, FSM 40 is able to maintain information relating to an operating state of the memory device 10. For example, FSM 40 may maintain information relating to a power state of different regions of the memory device 10, or information relating to which regions of the memory device are currently being accessed, or have recently been accessed. It will be appreciated that the maintained information is not limited to these specific examples and that the maintained information may relate to any aspect of the memory device that changes over time. Additionally, although in this embodiment it has been shown that the FSM 40 is able to snoop the access requests issued by the command interface 30 to the memory device 10, other methods of obtaining status information on the memory device 10 will be apparent to the skilled person. For example, memory device 10 may report information relating to its state directly to FSM 40. In another embodiment, command interface 30 may directly report information to FSM 40, thereby allowing FSM 40 to omit the need to snoop. FSM 40 is configured to generate and issue memory access activity data to scrub engine 55. In the embodiment described hereafter, the memory access activity data indicates a current state of the information stored by FSM 40.

Bandwidth monitor 45 monitors the available capacity (for example, available bandwidth) between command interface 30 and memory device 10. Bandwidth monitor 45 is able to determine the available bandwidth by snooping on control signals issued from command interface 30 to memory device 10. As with FSM 40, it will be appreciated that there are other ways in which this information can be determined. For example, bandwidth monitor 45 may receive reporting information from command interface 30 or memory device 10 relating to the available bandwidth. In this embodiment, bandwidth monitor 45 has knowledge of the maximum bandwidth of the control path between command interface 30 and memory device 10. By monitoring the amount of traffic issued between the command interface 30 and memory device 10 during a particular window, or period of time, bandwidth monitor 45 is able to determine how much bandwidth is unused and therefore available. In an alternative embodiment, bandwidth monitor 45 may simply monitor the quantity of bandwidth without reference to the capacity of the control path. Bandwidth monitor 45 could, for example, monitor available bandwidth by a comparison of current bandwidth usage compared to historic bandwidth usage. In the embodiment described hereafter, bandwidth monitor 45 is configured to generate memory access activity data relating to the current bandwidth of the line between command interface 30 and memory device 10.

ECC detect/correct circuitry 50 is part of the activity monitoring circuitry and is configured to detect errors in memory that has been accessed from memory device 10. When data is retrieved from memory device 10 in response to a read access request, it is stored in buffer 35. Additionally, the data is forwarded to ECC detect/correct circuitry 50 in order to determine whether the retrieved data has any errors, and to correct those errors if possible. As part of this process, any corrected data is written back to memory device 10 by issuing at least one write access request via multiplexer 60 to the queue 25, for subsequent issue to the memory device 10 by the command interface 30. The corresponding corrected data is stored as write data within the buffer 35, for forwarding to the memory device when the write access request is subsequently processed by the memory device 10.

The ECC detect/correct circuitry 50 generates memory access activity data when an error is detected in a page of memory. Scrub engine 55 is configured to respond to a predefined number of errors being detected during a period of time. The predefined number of errors and the period of time both depend on the extent to which the user wishes to prioritise reliability over performance cost/system power consumption. For example, if the predetermined value is one, then scrub engine 55 will respond to the detection of any error within a page of memory. Alternatively, if the predetermined number of errors is higher, then scrub engine 55 will respond less frequently in this manner. Accordingly, energy is likely to be saved by the resultant reduction in scrubbing activity. However, such a configuration allows the number of errors in memory to build up, and consequently the number of errors may build up beyond the point at which the data can be recovered. In the embodiment described hereafter, the predetermined value is one and so the ECC detect/correct circuitry 50 generates memory access activity data in response to any error detected in a page of memory.

FSM 40, bandwidth monitor 45, and ECC detect/correct circuitry 50 each generates memory access activity data as discussed above. The memory access activity data is sent to scrub engine 55, which determines whether any of the trigger conditions have been "hit", i.e. that a trigger condition has been met. In response to a trigger being "hit", the scrub engine 55 is configured to initiate an associated scrubbing operation to issue scrubbing access requests to the queue 25 for subsequent issue by command interface 30 to the memory device 10. A scrubbing access request is an access request directed towards an address of memory that is to be scrubbed. The scrubbing access request causes the data at the memory address identified in the request to be accessed and sent to buffer 35, and ECC detect/correct circuitry 50. The ECC detect/correct circuitry 50 then analyses the data to determine whether any errors are detected and, if applicable, seeks to correct those errors. The corrected data is written back as write data to the buffer 35, and a write-back is performed by issuing a write access request to command interface 30 via queue 25 to replace the data stored in memory device 10 with the data written to the buffer 35. In this way, a scrubbing access request acts in the same way as an access request made or solicited by the at least one requesting device, with the difference that the data retrieved from memory device 10 and stored in buffer 35 is not returned to source 15. That is, the scrubbing access request is an access request that does not originate from source 15. The scrubbing engine 55 will be discussed in more detail later with reference to FIG. 2.

Access requests placed in the queue 25 used by command interface 30 may originate from source 15, scrub engine 55 in the form of scrubbing access requests, and ECC detect/correct circuitry 50 in the form of write-backs to memory device 10 to correct data stored therein. The embodiment shown in FIG. 1 provides a multiplexer 60 in order to funnel these requests, that originate from different circuits, into queue 25.

Configuration data store 65 stores information relating to the operation of scrub engine 55. The content of configuration data store 65 will be discussed in more detail later with reference to FIG. 4.

Figure 2:
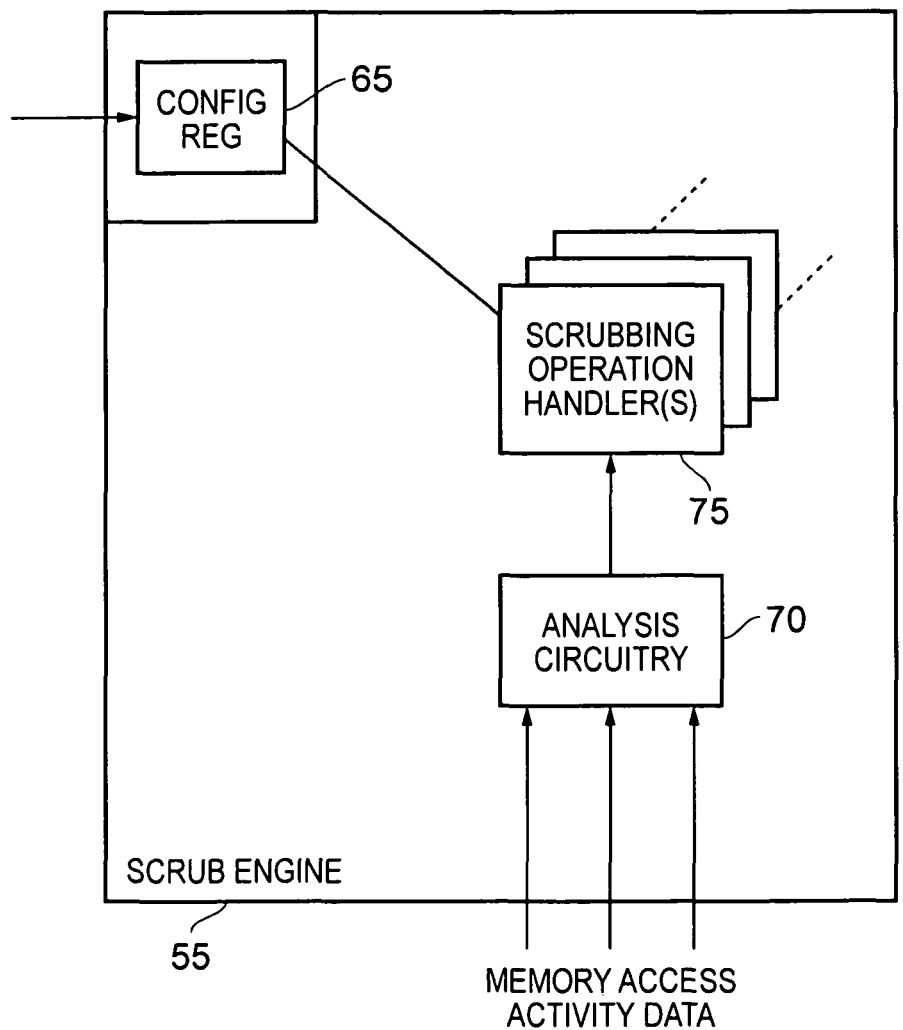
FIG. 2 is a block diagram of the scrub engine of FIG. 1 in accordance with one embodiment.

FIG. 2 is a block diagram illustrating the scrub engine 55 and associated configuration data store 65 of FIG. 1 in more detail in accordance with one embodiment.

FIG. 2 shows analysis circuitry 70, which receives memory access activity data from FSM 40, bandwidth monitor 45, and/or ECC detect/correct circuitry 50 as shown in FIG. 1. Analysis circuitry 70 analyses the incoming memory access activity data in order to determine which if any of the trigger conditions is met, thereby causing a trigger "hit". Scrubbing operation handlers 75 are then notified of any trigger "hits" that have occurred. In an alternative embodiment, the analysis circuitry 70 may form part of the activity monitoring circuitry. In such an embodiment, the activity monitoring circuitry is configured to generate the memory access activity data and to analyse that activity in order to output, to the scrub engine 55, an indication of whether a trigger "hit" has occurred. In the embodiment shown in FIG. 2, the different trigger conditions are known to the scrub engine 55. Accordingly, when the analysis circuitry 70 needs to determine whether a particular trigger condition is "hit" or met, it is simply necessary for the analysis circuitry 70 to determine that one or more of the known trigger conditions has occurred. Each of the scrubbing operation handlers 75 is then notified of which trigger condition has been met.

Figure 4:
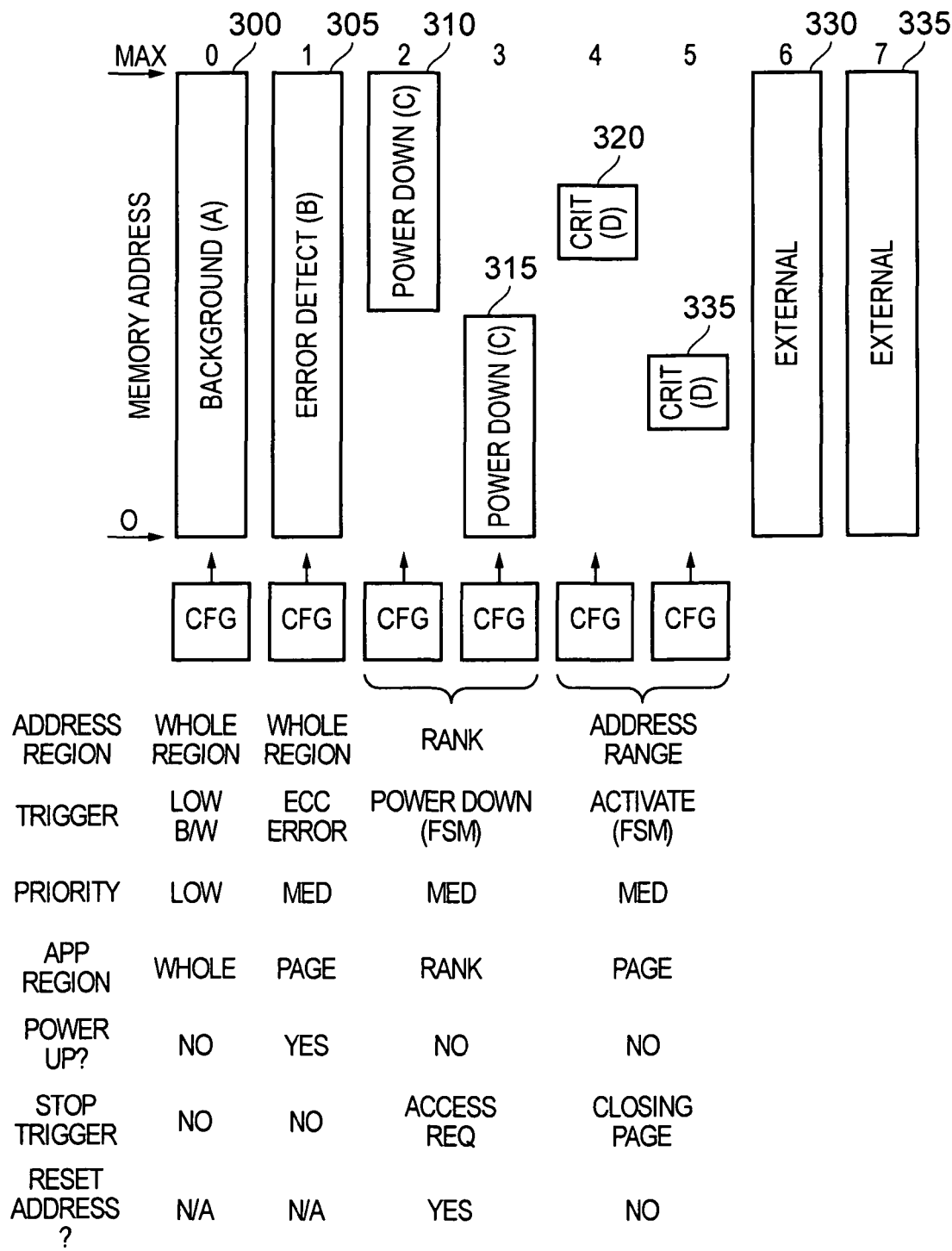
FIG. 4 is a diagram schematically illustrating the configuration of a plurality of scrubbing operations, in accordance with one embodiment.

In the embodiment of FIG. 2, each of the scrubbing operation handlers 75 is a circuit designed to handle a scrubbing operation. A scrubbing operation is a process that causes a plurality of scrubbing access requests to be issued in accordance with particular configuration data, which defines the scrubbing operation. Example configuration data for different scrubbing operations is shown in FIG. 4.

The embodiment in FIG. 2 stores the configuration data in a configuration register 65, which may be provided either as part of the scrub engine or externally to the scrub engine. The configuration register 65 can be accessed by the scrubbing operation handlers 75 in order to determine the configuration data that defines a particular scrubbing operation. Furthermore the configuration register 65 can be programmed by an external source (such as one of the devices forming source 15) in order to activate a particular configuration and thereby define a particular scrubbing operation to be executed. Although a particular embodiment shows that an external source is used for programming the configuration register 65, it will be appreciated that the programming source could also be internal to the scrubbing engine 55.

Each scrubbing operation handler may include its own processing elements. However, in other embodiments the scrubbing operation handlers may be replaced with a single circuit with suitable processing elements (e.g. a single circuit that performs processing using a general purpose processing circuit), whilst in a further alternative embodiment the handlers may be virtual (i.e. software implemented) handlers that respond to trigger conditions. Each scrubbing operation handler 75 is notified of which of the trigger conditions have been "hit". When one of the scrubbing operation handlers 75 receives a notification from the analysis circuitry 70, the scrubbing operation handler checks the configuration data that defines the associated scrubbing operation to determine if the "hit" trigger is relevant to the scrubbing operation to be executed on the scrubbing operation handler. If the "hit" trigger is not relevant, the trigger is disregarded for that particular scrubbing operation handler. Alternatively, if the trigger is relevant to the scrubbing operation, then a scrubbing operation may be started in response to the trigger condition being met, resulting in a plurality of scrubbing access requests being issued by the scrub engine 55. In some embodiments, the configuration data that defines a scrubbing operation may include a stop trigger. In such cases, if the trigger condition corresponds with the stop trigger for a particular scrubbing operation, the scrubbing operation will be either interrupted or stopped. The scrubbing operation may then start again or resume when the start trigger is detected, as previously discussed.

Figure 3:
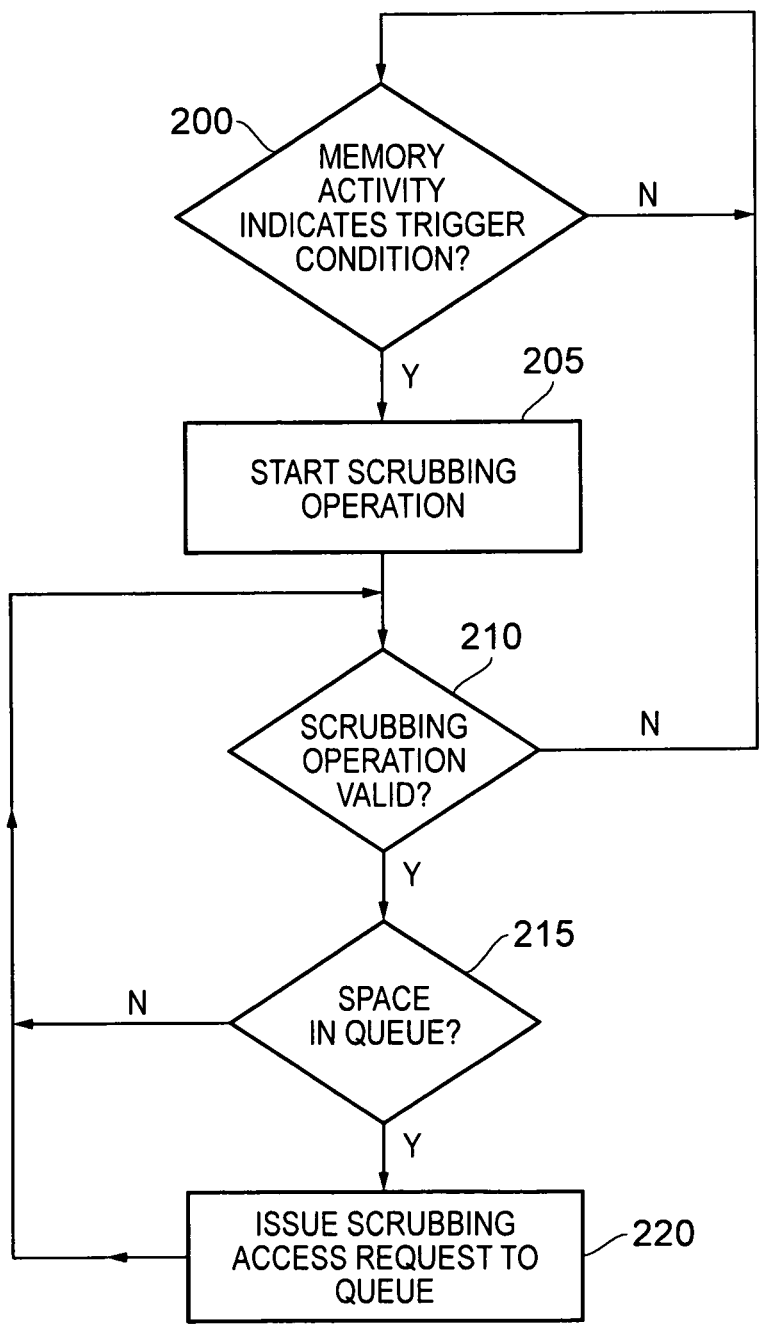
FIG. 3 is a flow diagram illustrating the operation of a scrubbing operation in accordance with one embodiment.

FIG. 3 is a flow chart illustrating the scrubbing operation process performed by each scrubbing operation handler 75. The process begins at step 200 where it is determined whether the memory access activity data indicates a particular trigger condition has been met. As previously discussed, with reference to FIG. 2, this is determined from memory access activity data generated by activity monitoring circuitry, which may comprise one or more of the FSM 40, bandwidth monitor 45, ECC detect/correct circuitry 50, or other circuitry that generates memory access activity data resulting from memory access activity between the command interface 30 and the memory device 10. In the flow chart of FIG. 3, the process loops until the memory access activity data indicates that a trigger condition for the associated scrubbing operation has been met. When this event occurs the scrubbing operation begins as shown in step 205 and execution passes to step 210.

In step 210, it is determined whether the scrubbing operation is valid. A scrubbing operation may be considered to no longer be valid if the scrubbing operation cannot be carried out any longer, or at least not with the initially intended level of efficiency. For example, a scrubbing operation may become invalid if the region of memory that the scrubbing operation is attempting to target with scrubbing access requests becomes deactivated, i.e. if another row of memory is opened. A scrubbing operation may also become invalid if the region of memory to which the scrubbing operation is issuing scrubbing access requests enters a low power mode. A scrubbing operation will also become invalid if it completes, that is, if a scrubbing operation has issued all of the necessary scrubbing access requests to each memory location within a target region, then the scrubbing operation is completed and so is no longer considered to be valid. If the aforementioned stop trigger is included as part of the definition of the scrubbing operation then the scrubbing operation is considered to become invalid when the stop trigger is detected. As will be appreciated by the skilled person, a scrubbing operation may become invalid for any one of these reasons, any combination of these reasons, or for other reasons that would be apparent to the skilled person. If the scrubbing operation is no longer considered to be valid then execution passes back to step 200, where the process waits for memory access activity data to indicate that a trigger condition has been "hit". If the scrubbing operation remains valid, then execution passes to step 215.

In step 215, it is determined whether there is space remaining in the queue 25. If queue 25 does not have sufficient space for a scrubbing access request to be issued, then execution returns to step 210 where the scrubbing operation is checked to ensure that the operation remains valid. Steps 210 and 215 collectively cause a scrubbing operation to continue to attempt to issue scrubbing access requests for as long as possible, if the queue does not have available space. It may be the case that after a period of waiting for space to appear in a queue, the scrubbing operation will become invalid (for example, as a result of the intended target of the scrubbing operation becoming inaccessible or entering a low power mode).

Multiple scrubbing operation handlers 75 may attempt to issue scrubbing access requests at the same time. In this situation, it may be the case that the queue 25 does not have sufficient capacity to accept all of the scrubbing access requests that the scrubbing operation handlers 75 are attempting to issue. In some embodiments, the scrubbing access requests are inserted into the queue 25 having regard to a priority associated with each scrubbing access request. Accordingly, those scrubbing access requests with higher priorities (i.e. those of higher importance) will be accepted into the queue in preference to those with a lower priority.

Assuming there is space in the queue, the process proceeds to step 220 where a scrubbing access request is issued. In the embodiment of FIG. 3, the scrubbing access request passes through multiplexer 60 to queue 25. The scrubbing access request is directed towards an address of memory which is next to be targeted by the scrubbing operation. Control then passes to step 210 where the scrubbing operation is checked for validity once more. The flow chart of FIG. 3 represents a generic process for executing a scrubbing operation. It will be appreciated by the skilled person that some of these steps may be executed in a different order or may be omitted entirely for different scrubbing operations. Furthermore particular scrubbing operations may involve additional steps not shown.

FIG. 4 shows a plurality of scrubbing operations 300, 305, 310, 315, 320, 325, 330, 335. FIG. 4 also shows corresponding configuration data used to define each of the scrubbing operations including an address region, a trigger condition, a priority, an application region, a power-up flag, a stop trigger, and a reset address flag. These are described below with reference to a background scrubbing operation 300, which is designed to iteratively issue a scrubbing access request to each memory location within memory device 10. The background scrubbing operation 300 only issues scrubbing access requests during periods of low bandwidth.

The address region refers to a memory address region of memory device 10. The address region indicates what portion of memory the scrubbing operation is directed towards. In this embodiment, a trigger condition that refers to an address of memory outside the address region is disregarded by the scrubbing operation.

The trigger defines the start conditions for the scrubbing operation. In combination with the address region, these two items of configuration data indicate when a scrubbing operation starts, i.e. for a scrubbing operation to start the trigger condition must occur to a region of memory falling within the address region. For example, in the case of background scrubbing operation 300, the address region is the whole of the memory device 10, and hence the scrubbing operation starts whenever a low bandwidth is detected in relation to any region of the memory.

The priority indicates the importance with which the scrubbing access requests are to be handled and can be used by command interface 30 to select access requests having a higher priority in preference to those having a lower priority, thereby causing the higher priority access requests to be processed more quickly than those of lower priority.

The application region indicates a target for the scrubbing operation. That is, when the scrubbing operation begins, the scrubbing operation will attempt to issue at least one scrubbing access request to each memory location within the application region associated with the memory access activity data that caused the trigger. For example, the background scrubbing operation 300 has an application region of "whole". The result is that when a low bandwidth is detected the background scrubbing operation 300 will attempt to issue a scrubbing access request to each memory location in the entire memory device 10.

The power-up flag indicates whether a portion of the memory device 10 is to be powered up in order to allow the scrubbing operation to be performed in respect of at least that portion of the memory device. In many cases it may be desirable to allow a portion of the memory device 10 that has entered a low power state to continue to remain in that state in order to conserve power. However, if a scrubbing operation must be urgently carried out, for example if there is a high or unacceptable risk of data in that portion of the memory device 10 becoming irretrievable, then it may be acceptable to power-up that portion of the memory device 10 in order to issue the scrubbing access requests.

As previously discussed, the stop trigger represents a condition that, if met, causes the scrubbing operation to be interrupted or stopped. Although not all scrubbing operations have a specific stop trigger, a scrubbing operation may also stop if the scrubbing operation becomes invalid as discussed with reference to step 210 in FIG. 3.

The configuration data may define a reset address flag. When unset, the reset address flag causes the last targeted address of the scrubbing operation to be recorded. If such an address is recorded, then when the scrubbing operation resumes or starts, it will continue from the point at which it reached when it was stopped, for example when it was stopped by the stop trigger.

Aside from the background scrubbing operation 300, which has been discussed in relation to the above configuration options, the embodiment shown in FIG. 4 shows several other example scrubbing operations. The associated configuration options for these scrubbing operations are defined in more detail, below.

Error detection scrubbing operation 305 reacts to a detection of an error in an accessed region of memory. Consequently, the trigger for this scrubbing operation is an ECC error, which may be detected for example by ECC detect/correct circuitry 50 shown in FIG. 1. The trigger relates to an error detected in any part of the memory device 10, and hence the address region is the "whole" region of memory device 10. Since the detection of an error indicates that a region of memory is unlikely to have been recently scrubbed, the priority of the error detection scrubbing operation 305 is set to be "medium". This is designed to reflect the increased urgency with which a scrubbing operation must be performed. The application region is page, indicating that the error detection scrubbing operation 305 will attempt to target each memory address within the same page in which the ECC error was detected. Due to the increased urgency with which the page must be scrubbed, the power-up flag is set to "yes". The error detection scrubbing operation 305 does not have a stop trigger, and also does not have a reset address flag defined.

The embodiment of FIG. 4 shows two power down scrubbing operations 310 and 315. Each of the two power down scrubbing operations 310, 315 is the same, except for the fact that each one relates to a different rank of memory (in this example it is assumed that the memory device is formed of two ranks, each rank typically being formed of multiple memory chips). The power down scrubbing operations are designed to scrub a location in memory prior to the memory entering a low power mode of operation. Since a location in memory may not be accessed while in a low power mode, this aims to remove errors within the memory region before starting a potentially long period in which scrubbing could not be performed without incurring the power consumption cost of powering up the relevant memory region. In each case, the trigger condition is that the rank of memory is due to be powered down, which can be detected by FSM 40. The address region of power down scrubbing operation 310 is set to identify a first rank and the address region of the second power down scrubbing operation 315 is set to identify a second rank. Accordingly, the first power down scrubbing operation 310 will only be started in response to the first rank of memory being about to enter a low power mode of operation. Similarly, the second power down scrubbing operation 315 will only be started in response to the second rank of memory being about to enter a low power mode of operation. The priority of these operations is set to be "medium", which will increase the likelihood of the scrubbing access operations being issued to memory device 10 before the corresponding rank of memory enters a low power mode of operation. The power down scrubbing operations 310, 315 do not have the power-up flag set. The purpose of the power down scrubbing operation is to opportunistically perform scrubbing before a memory region is powered down, and accordingly it is not appropriate to power that region back up if it is powered down before the scrubbing operation completes. The operations have a stop trigger of an access request directed towards the corresponding rank of memory. This is because if a solicited access request is issued towards one of the ranks of memory by the source 15, it is necessary for the low power mode of operation to be abandoned in order that the memory can be accessed. Accordingly, the rank of memory will not enter a low power mode of operation and so the scrubbing operation can be terminated. The reset address flag is set in order that when a power down scrubbing operation starts again, each of the memory locations within the rank of memory is scrubbed (the scrubbing operation does not merely continue from the memory address it was issuing a scrubbing access request for when it was previously terminated).

Critical area scrubbing operations 320, 325 cause a particular region or regions of memory to be regularly scrubbed. This process may be suitable for small areas of memory containing, for example, database search keys, whose loss could be highly detrimental to system performance. Accordingly, this scrubbing operation reduces the probability of that data being lost, by carrying out scrubbing operations more frequently than for other regions of memory. The address region for each of these critical area scrubbing operations 320, 325 is a specific address range, i.e. of the critical area of memory. The trigger for these operations is the activation of a row of memory, which can be indicated by the FSM 40. That is, whenever a page of memory falling within one of the critical regions is activated, the associated critical area scrubbing operation 320, 325 will issue a scrubbing access request to each memory address within the same page. Accordingly, the application region is set to page. The priority of these operations is also set to medium. The power-up flag for these scrubbing operations is set to "no". However, in other embodiments with even more critical data, this value will be set to "yes". The scrubbing operations have a stop trigger associated with them of the corresponding page of memory being closed. This means that if the page that is targeted by the scrubbing operation is to be closed, then the critical region scrubbing operation 320, 325 will be stopped. This can be used to prevent a region of memory from being repeatedly activated and closed, which could be detrimental to system performance or power cost. The scrubbing operations also have a reset address set to "no", which indicates that when these scrubbing operations resume, they will resume from the point at which the scrubbing operation was last interrupted. This means that each memory address within the page of memory is scrubbed with the same frequency.

Such critical area scrubbing operations hence take advantage of a page already being activated to perform scrubbing accesses to addresses within that page, incurring significantly less power consumption than if the page had to be activated specifically to perform scrubbing.

The embodiment shown in FIG. 4 also shows two external input scrubbing handlers, which are designed to respond to scrubbing instructions from an external source. These scrubbing operation handlers do not have specific configuration data associated with them, since their behaviour is dependent on the instructions received from the external source. The external input scrubbing handlers can be used to perform scrubbing access requests as directed by an external source or a user and can therefore be made to perform scrubbing on demand. Alternatively, configuration data can be switched in or out, or can be dynamically "built" for each handler.

The example configuration data shown in FIG. 4 are intended as examples only. It will be appreciated by the skilled person that a variety of different configurations are possible depending on the architecture of the system and the goal of the systems design.

Figure 5:
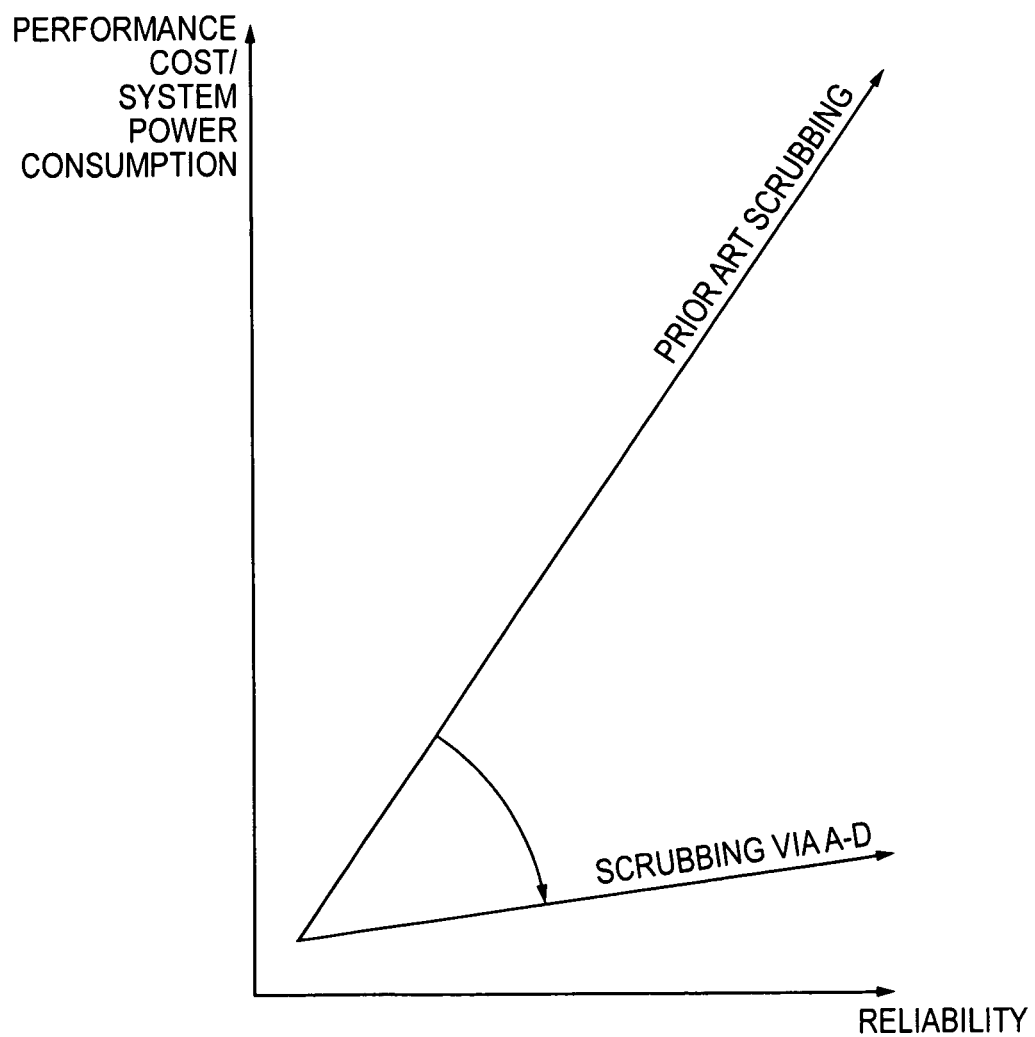
FIG. 5 is a diagram schematically illustrating how the use of scrubbing operations in accordance with one embodiment provides an improvement to the performance cost/system power consumption to reliability ratio over prior art scrubbing operations.

FIG. 5 shows a graph schematically illustrating the performance cost/system power consumption that is required in order to achieve a particular reliability of memory when performing scrubbing. The line marked PRIOR ART SCRUBBING shows the performance cost/system power consumption that is necessary in order to achieve a particular level of reliability when applying prior art scrubbing techniques.

As a result of apply scrubbing operations 300, 305, 310, 315, 320, 325 (A-D), it is possible to reduce the gradient of this line and thereby reduce the performance cost/system power consumption required in order to achieve a particular level of reliability through scrubbing. This can be achieved because scrubbing operations carried out in accordance with the described embodiment are performed intelligently, i.e. opportunistically, and therefore carry out scrubbing when opportunities to perform scrubbing arise that will not significantly affect the performance cost or system power.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. An apparatus for accessing a memory device in response to access requests issued by at least one requesting device, said apparatus comprising:
    interface circuitry configured to access said memory device in response to said access requests;
    activity monitoring circuitry configured to generate memory access activity data resulting from memory access activity between said interface circuitry and said memory device; and
    scrubbing circuitry comprising:
        a plurality of scrubbing handlers configured to perform an associated scrubbing operation in response to said memory access activity indicating a trigger condition; each scrubbing operation being defined by configuration data associated with each scrubbing handler and defining said associated scrubbing operation,
    wherein said scrubbing circuitry is configured to issue at least one scrubbing access request for processing by the interface circuitry in dependence on said configuration data.

2. An apparatus according to claim 1, wherein
said scrubbing circuitry comprises analysis circuitry configured to analyse said memory access activity data and to determine from said memory access activity data whether said trigger condition is met.

3. An apparatus according to claim 1, wherein
said configuration data identifies said trigger condition; and
each scrubbing handler is configured to perform the associated scrubbing operation in response to a determination that said trigger condition identified in said associated configuration data is met.

4. An apparatus according to claim 1, wherein
said configuration data comprises an address region of said memory device; and
each scrubbing handler is configured to perform the associated scrubbing operation if said memory access activity data results from memory access activity between said interface circuitry and an address of said memory device that falls within said address region.

5. An apparatus according to claim 1, wherein
said configuration data comprises an application region; and
each scrubbing handler is configured to perform the associated scrubbing operation by issuing at least one scrubbing access request to each address of said memory device within the application region.

6. An apparatus according to claim 1, wherein
said configuration data comprises a priority level; and
each scrubbing handler is configured to perform the associated scrubbing operation by issuing each scrubbing access request with an indication of said priority level.

7. An apparatus according to claim 1, wherein
said configuration data comprises a power-up flag; and
each scrubbing handler is configured, if said power-up flag is set, to cause at least a portion of said memory device to be powered up if said at least a portion of said memory device is in a low power mode of operation, in order to allow said associated scrubbing operation to be performed in respect of said at least a portion of said memory device.

8. An apparatus according to claim 1, wherein
said configuration data comprises a second trigger condition; and
each scrubbing handler is configured to interrupt the associated scrubbing operation in response to said second trigger condition being detected.

9. An apparatus according to claim 1, wherein
said configuration data comprises a reset address flag;
said scrubbing handler is configured, if said reset address flag is not set, to store a memory address of a last scrubbing access request issued by said associated scrubbing operation in response to said associated scrubbing operation being interrupted; and
said scrubbing handler is further configured, if said reset address flag is not set, to resume execution of said associated scrubbing operation from said stored memory address in response to a subsequent determination that said trigger condition is met.

10. An apparatus according to claim 1, wherein said scrubbing circuitry comprises:
    at least one external input scrubbing handler configured to receive scrubbing instructions received by the apparatus, wherein
    said at least one external input scrubbing handler is configured to issue a plurality of scrubbing access requests in dependence on said received scrubbing instructions.

11. An apparatus according to claim 1, wherein
said apparatus comprises a configuration register for storing said configuration data.

12. An apparatus according to claim 1, wherein
said activity monitoring circuitry comprises error detection circuitry for detecting errors in data returned from said memory device as a result of said access requests.

13. An apparatus according to claim 12, wherein
said scrubbing circuitry is configured to detect said trigger condition if said memory access activity data detects a predetermined number of errors in data within a page of memory returned from said memory device as a result of said access requests.

14. An apparatus according to claim 13, wherein
said predetermined number of errors is one.

15. An apparatus according to claim 1, wherein
said activity monitoring circuitry comprises a state machine for maintaining information concerning an operating state of said memory device.

16. An apparatus according to claim 15, wherein
said scrubbing circuitry is configured to detect said trigger condition if said memory access activity data indicates that at least a portion of said memory device is to enter a low power state.

17. An apparatus according to claim 15, wherein
said scrubbing circuitry is configured to detect said trigger condition if said memory access activity data indicates that a page of memory within said memory device has been activated.

18. An apparatus according to claim 1, wherein
said activity monitoring circuitry comprises capacity monitoring circuitry for monitoring available capacity between said interface circuitry and said memory device taking into account said memory access activity between said interface circuitry and said memory device.

19. An apparatus according to claim 18, wherein
said scrubbing circuitry is configured to detect said trigger condition if said memory access activity data indicates that said available capacity is, at least, a predetermined value.

20. An apparatus according to claim 1, wherein
said apparatus comprises a queue for storing a plurality of pending access requests;
said apparatus is configured to issue said at least one scrubbing access request to said queue; and
said interface circuitry is configured to select at least one of said pending access requests for processing from said queue.

21. A method for issuing scrubbing access requests, said method comprising the steps:
receiving activity data resulting from memory access activity between interface circuitry and a memory device;
in response to said memory access activity indicating a trigger condition, causing at least one scrubbing handler of a plurality of scrubbing handlers to receive said trigger condition;
each of said at least one scrubbing handler performing an associated scrubbing operation defined by configuration data associated with that scrubbing handler and defining said associated scrubbing operation; and
in dependence on said configuration data, issuing at least one of said scrubbing access requests for processing.

22. Scrubbing apparatus, comprising:
a plurality of scrubbing handlers configured to perform an associated scrubbing operation on receipt of a trigger condition,
each scrubbing operation being defined by configuration data associated with each scrubbing handler and defining said associated scrubbing operation,
wherein said scrubbing circuitry is configured to issue at least one scrubbing access request in dependence on said configuration data.

* * * * *